Oct. 3, 1933.  A. NARATH  1,929,254
NONHALATION FILM
Filed Nov. 12, 1930
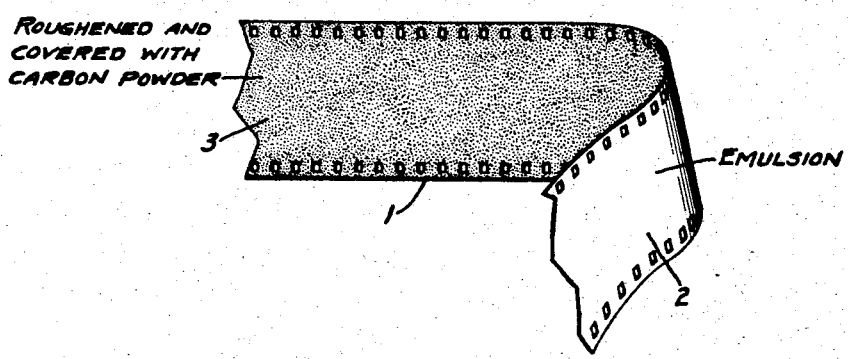
Inventor:
Albert Narath,
by Charles V. Tulla
His Attorney.

UNITED STATES PATENT OFFICE 1,929,254

NONHALATION FILM

Albert Narath, Berlin, Germany, assignor to General Electric Company, a corporation of New York Application November 12, 1930, Serial No. 495,251, and in Germany November 16, 1929

4 Claims. (Cl. 95—9)

My invention relates to photographic films such for example as those employed in making motion picture records, sound records and sound-picture records. It is well known to those skilled in the art that when a film is exposed to a strong light in the recording process, objectionable halation effects often are produced. This is particularly true in sound recording where the exposure of the film is effected by a narrow beam of light of great intensity. It is the object of my invention to provide an improved process and product whereby the above mentioned objectionable halation effects may be greatly reduced if not entirely eliminated.

In accordance with my invention I bring about the desired result by roughening the rear face of the film so that light which passes through the emulsion in the exposing process is not reflected back into the emulsion as with films constructed in the usual manner, but is diffused or dispersed. The roughening of the film may be done in any suitable manner and either before or after the emulsion is applied thereto. I also apply to the roughened film surface a light absorbing substance which fills in all of the depressions or interstices produced by the roughening process. It is desirable that the light absorbing substance employed shall be one having the same or approximately the same refractive index as the material composing the body of the film. It is also desirable that the substance be of such a nature that it is readily removed during the developing, the fixing or the washing of the film. While various substances may be used for this purpose, I have found carbon powder to be satisfactory.

In the single figure of the drawing illustrating my invention I have shown at 1 a film having on one side the usual light sensitive emulsion 2. The rear face of the film is roughened and covered with a light absorbing substance 3 such for example as carbon powder. With a film as so constructed, that part of the exposing light which passes on through the emulsion and the body of the film is effectively diffused, or dispersed by the roughened rear face and is absorbed by the absorbing material thereon.

I have chosen the particular embodiment described above as illustrative of my invention and it will be apparent that various other modifications may be made without departing from the spirit and scope of my invention, which modifications I aim to cover by the appended claims.

What I claim as new and desire to secure by Letters Patent of the United States is:

1. The method of reducing halation in a photographic film which comprises roughening the material forming the film at the rear face thereof and applying to the roughened face a light absorbing substance.

2. The method of reducing halation in a photographic film which comprises roughening the material forming the film at the rear face thereof and applying carbon powder to the roughened face.

3. A non-halative film having the material of which the film is composed roughened at the rear face thereof and covered with a light absorbing substance.

4. A non-halative film having the material of which the film is composed roughened at the rear face thereof and covered with a light absorbing substance comprising carbon powder.

ALBERT NARATH.